United States Patent
Tomisho

(10) Patent No.: US 10,284,481 B2
(45) Date of Patent: May 7, 2019

(54) COMMUNICATION DEVICE, COMMUNICATION METHOD, AND STORAGE MEDIUM

(71) Applicant: CANON KABUSHIKI KAISHA, Tokyo (JP)

(72) Inventor: Tatsuhiko Tomisho, Niigata (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 15/729,268

(22) Filed: Oct. 10, 2017

(65) Prior Publication Data
US 2018/0102977 A1    Apr. 12, 2018

(30) Foreign Application Priority Data

Oct. 12, 2016   (JP) .................................. 2016-201254

(51) Int. Cl.

| | |
|---|---|
| H04L 12/835 | (2013.01) |
| H04W 72/12 | (2009.01) |
| H04L 12/825 | (2013.01) |
| H04L 12/807 | (2013.01) |
| H04W 28/02 | (2009.01) |
| H04W 28/12 | (2009.01) |
| H04L 12/801 | (2013.01) |
| H04L 12/805 | (2013.01) |

(52) U.S. Cl.
CPC ............ *H04L 47/30* (2013.01); *H04L 47/263* (2013.01); *H04L 47/27* (2013.01); *H04W 72/1284* (2013.01); *H04L 47/14* (2013.01); *H04L 47/36* (2013.01); *H04W 28/0278* (2013.01); *H04W 28/12* (2013.01)

(58) Field of Classification Search
None
See application file for complete search history.

(56) References Cited

U.S. PATENT DOCUMENTS

| | | | | |
|---|---|---|---|---|
| 2006/0036820 | A1* | 2/2006 | Ejiri | G06F 3/0605 |
| | | | | 711/158 |
| 2014/0006357 | A1* | 1/2014 | Davis | G06F 11/1464 |
| | | | | 707/667 |

(Continued)

FOREIGN PATENT DOCUMENTS

JP      2009237768 A    10/2009

*Primary Examiner* — Eunsook Choi
(74) *Attorney, Agent, or Firm* — Canon U.S.A., Inc. IP Division

(57) ABSTRACT

A communication device includes a reception unit configured to receive data transmitted from another communication device in response to a notification indicating an amount of data allowed to be transmitted, a storage unit configured to store the received data in a storage area, a determination unit configured to determine whether or not another buffer can be secured, in addition to a reception buffer having a capacity reserved upon establishment of a logical communication path between the communication device and the another communication device, the another buffer being configured to store data that cannot be stored in the reception buffer among the received data, a decision unit configured to decide the amount of data allowed to be transmitted from the another communication device based on a result of the determination, and a notification unit configured to send, to the other communication device, a notification indicating the decided amount of data.

19 Claims, 9 Drawing Sheets

(56) References Cited

U.S. PATENT DOCUMENTS

| | | | | |
|---|---|---|---|---|
| 2015/0021444 A1* | 1/2015 | Goergen | ............... | G06F 3/0604 |
| | | | | 246/122 R |
| 2017/0351445 A1* | 12/2017 | Shimomura | ............ | H04L 12/28 |
| 2018/0018113 A1* | 1/2018 | Koseki | .................. | G06F 3/0619 |
| 2018/0095855 A1* | 4/2018 | Sanakkayala | ....... | G06F 9/45558 |

* cited by examiner

FIG. 4

| Option TYPE (3) | Option LENGTH (3) | Shift.cnt |

WINDOW SCALE OPTION

FIG. 5

SCALE FACTOR AND SCALE UNIT CAPACITY

| SCALE FACTOR | SCALE UNIT CAPACITY (BYTE) |
|---|---|
| 0 | 1 |
| 1 | 2 |
| 2 | 4 |
| 3 | 8 |
| 4 | 16 |
| 5 | 32 |
| 6 | 64 |
| 7 | 128 |
| 8 | 256 |
| 9 | 512 |
| 10 | 1024 |
| 11 | 2048 |
| 12 | 4096 |
| 13 | 8192 |
| 14 | 16384 |

FIG.6A

| AVAILABLE BUFFER STORAGE CAPACITY | SCALE UNIT CAPACITY=256 (SCALE FACTOR=8) ||
|---|---|---|
| | WINDOW SIZE WHEN ROUNDED DOWN | WINDOW SIZE WHEN ROUNDED UP |
| 4500 | 4352 | 4608 |
| 3000 | 2816 | 3072 |
| 1500 | 1280 | 1536 |
| 0 | 0 | 0 |

FIG.6B

| AVAILABLE BUFFER STORAGE CAPACITY | SCALE UNIT CAPACITY=2048 (SCALE FACTOR=11) ||
|---|---|---|
| | WINDOW SIZE WHEN ROUNDED DOWN | WINDOW SIZE WHEN ROUNDED UP |
| 4500 | 4096 | 6144 |
| 3000 | 2048 | 4096 |
| 1500 | 0 | 2048 |
| 0 | 0 | 0 |

COMMUNICATION DEVICE, COMMUNICATION METHOD, AND STORAGE MEDIUM

BACKGROUND

Field of the Disclosure

The present disclosure relates to a technique for controlling the amount of data to be transmitted and received between communication devices.

Description of the Related Art

One of the communication methods employed between communication devices is a transmission control protocol (TCP)/internet protocol (IP). A communication device that performs communication in accordance with the TCP/IP establishes a logical communication path (connection) with another communication device, which is a communication partner, and manages reception buffers for each communication path. Data received by the communication devices is temporarily stored in the reception buffers. The reception buffer has a prescribed capacity, and memory resources of the communication devices are allocated as each reception buffer.

The TCP/IP has a window control function of preventing an amount of data more than the capacity of a reception buffer from being transmitted to a communication device. Under the window control, a data receiving device notifies a data transmitting device of the capacity of a reception buffer as a window size indicating the amount of data allowed to be transmitted through a target communication path. The transmitting device transmits, to the receiving device, an amount of data equal to or less than the notified window size via the target communication path. The window control prevents an amount of data more than the capacity of the reception buffer of the receiving device from being transmitted from the transmitting device.

Meanwhile, Japanese Patent Laid-Open No. 2009-237768 discloses a technique in which a communication device sends a notification about a window size showing a value greater than an available storage capacity of a reception buffer. When the communication device receives data having a size larger than the available storage capacity of the reception buffer, a temporary buffer that is different from the reception buffer is used to store data that cannot be stored in the reception buffer.

However, in the communication method disclosed in Japanese Patent Laid-Open No. 2009-237768, reception of data having a size larger than the amount of data that can be stored may lead to deterioration in communication efficiency. For example, in a case where the communication device cannot use the temporary buffer due to lack of memory resources, if data having a size larger than the available storage capacity of the reception buffer is received, the received data that cannot be stored in the reception buffer may be discarded, which may lead to deterioration in communication efficiency.

SUMMARY

According to an aspect of the present disclosure, a communication device includes a reception unit configured to receive data transmitted from another communication device in response to a notification indicating an amount of data allowed to be transmitted, a storage unit configured to store the data received by the reception unit in a storage area, a determination unit configured to determine whether or not another buffer can be secured as a storage area in which data is stored by the storage unit, in addition to a reception buffer having a capacity reserved upon establishment of a logical communication path between the communication device and the another communication device, the another buffer being configured to store data that cannot be stored in the reception buffer among the data received by the reception unit, a decision unit configured to decide the amount of data allowed to be transmitted from the another communication device based on a result of the determination by the determination unit, and a notification unit configured to send, to the another communication device, a notification indicating the amount of data allowed to be transmitted which is decided by the decision unit.

Further features of the present disclosure will become apparent from the following description of exemplary embodiments with reference to the attached drawings.

BRIEF DESCRIPTION OF THE DRAWINGS

FIG. 4 is a diagram illustrating a format of a window scale option according to one or more aspects of the present disclosure.

FIG. 5 is a table illustrating a correspondence relation between a scale factor and a scale unit capacity according to one or more aspects of the present disclosure.

FIGS. 6A and 6B are tables each illustrating a window size in accordance with a scale factor according to one or more aspects of the present disclosure.

DESCRIPTION OF THE EMBODIMENTS

Exemplary embodiments of the present disclosure will be described below with reference to the drawings. Not all combinations of features described in the following exemplary embodiments are essential to the present disclosure.

[System Configuration]

Figure 1:
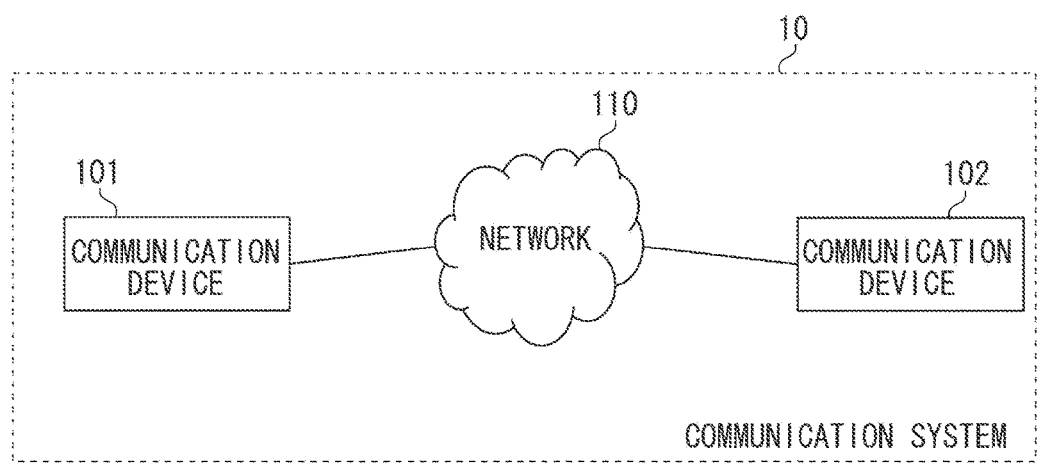
FIG. 1 is a diagram illustrating a configuration of a communication system according to one or more aspects of the present disclosure.

FIG. 1 illustrates a configuration of a communication system 10 according to one or more aspects of the present disclosure. The communication system 10 includes a communication device 101 and a communication device 102. The communication device 101 and the communication device 102 perform TCP/IP communication via a network 110. In the present exemplary embodiment, the network 110 is composed of a local area network (LAN) based on Ethernet® standards. However, the configuration of the network 110 is not limited to this. For example, the network 110 may include the Internet, or may include a wireless LAN based on IEEE802.11 series standards or Bluetooth® standards. While the present exemplary embodiment is described focusing on the communication between two devices, i.e., the communication device 101 and the communication device 102, three or more devices may communicate with each other via the network 110. Further, the present exemplary embodiment illustrates an example in which the communication device 101 and the communication device 102 communicate with each other based on the TCP/IP. However, the communication device 101 and the communication device 102 may communicate with each other based on another protocol.

Figure 2:
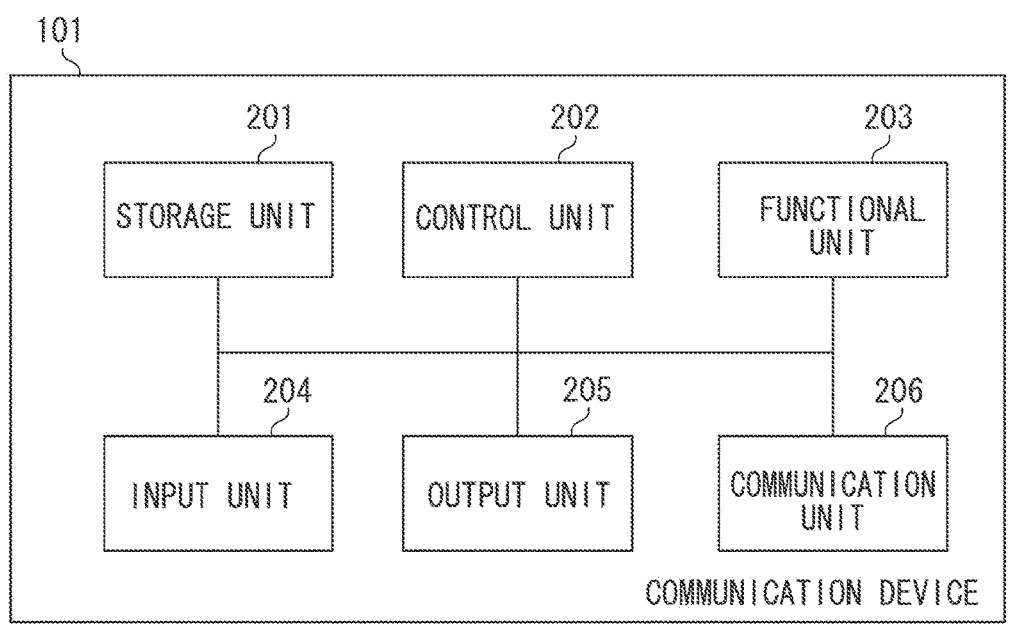
FIG. 2 is a block diagram illustrating a hardware configuration of a communication device according to one or more aspects of the present disclosure.

FIG. 2 illustrates a hardware configuration of the communication device 101 according to one or more aspects of the present disclosure. The communication device 102 has a hardware configuration similar to that of the communication device 101. The communication device 101 includes a storage unit 201, a control unit 202, a functional unit 203, an input unit 204, an output unit 205, and a communication unit 206.

The storage unit 201 includes a memory, such as a ROM or a RAM, and stores programs for performing various operations described below for the communication device 101, and various information such as communication parameters for TCP/IP communication. The storage unit 201 also functions as a network buffer that stores data to be transmitted and received between the communication device 101 and the communication device 102. As the storage unit 201, not only the ROM or the RAM, but also storage media such as a flexible disk, a hard disk, an optical disk, a magneto-optical disk, a CD-ROM, a CD-R, a magnetic tape, a non-volatile memory card, and a DVD, may be used.

The control unit 202 includes a processor such as a CPU or an MPU, and reads out the programs stored in the storage unit 201 and executes the programs to thereby control the entire communication device 101. The control unit 202 may control the entire communication device 101 in cooperation with the programs stored in the storage unit 201 and an operating system (OS). Further, the control unit 202 may include a plurality of processors using a multi-core or the like, and the entire communication device 101 may be controlled by the plurality of processors.

The functional unit 203 is a piece of hardware used for the communication device 101 to execute predetermined processing. For example, when the communication device 101 is a camera, the functional unit 203 includes an image pickup unit and performs image pickup processing. Further, when the communication device 101 is a printer, the functional unit 203 includes a print unit and performs print processing. Furthermore, when the communication device 101 is a projector, the functional unit 203 includes a projection unit and performs projection processing. Data processed by the functional unit 203 may be data preliminarily stored in the storage unit 201, or may be data acquired through communication with another device via the communication unit 206 described below.

The input unit 204 accepts various input operations performed by a user. The output unit 205 provides various outputs to the user. Examples of the output by the output unit 205 include an image output by a display unit, an audio output by a speaker, and a vibration output. Both the input unit 204 and the output unit 205 may be implemented by a single module using a touch panel or the like. The input unit 204 and the output unit 205 may be present as separate devices outside the communication device 101. In this case, the control unit 202 operates as an input control unit to control the input unit 204, and as an output control unit to control the output unit 205.

The communication unit 206 controls the TCP/IP communication and transmits a content such as image data, document data, and audio data, to another device such as the communication device 102, and receives the content from another device.

[Operation Flow]

First, a basic operation performed in the communication based on the TCP/IP will be described. At the start of the communication, a logical communication path (connection) for transmitting and receiving data is established between the communication device 101 and the communication device 102. The communication device 101 may establish a plurality of connections.

The communication device 101 and the communication device 102 which perform TCP/IP protocol processing are provided with a network buffer, to packetize communication data or perform transmission/reception processing. The network buffer is shared among a plurality of connections and is also shared in the transmission processing and reception processing. In the communication device 102 that transmits TCP/IP packets, data designated in accordance with a data transmission command from an application is copied to a storage area within the network buffer allocated as a transmission buffer. Transmission data copied to the storage area is divided in accordance with a maximum transmission unit (MTU). The term "MTU" described herein refers to a maximum size of data to be transmitted in a single frame from a transmitting-side communication device to a receiving-side communication device. A TCP header and an IP header are added to the divided transmission data to generate a TCP/IP packet. When Ethernet is used as a transmission path, an Ethernet frame is generated by further adding an Ethernet header, and the generated Ethernet frame is transmitted to the communication device 101.

In the communication device 101 that receives the TCP/IP packet, the packet received from the network is temporarily held in the memory or the like within the communication unit 206, and is divided into a header part and a data part of each packet. The data part of each packet is stored in the storage area within the network buffer allocated as the reception buffer corresponding to the connection. Further, the data stored in the reception buffer is moved (read out) in accordance with a data reception command from an application into a data buffer (application buffer) which is prepared by the application, and processing is carried out on the received data. The reception buffer has a predetermined data capacity reserved at the time of the establishment of a connection, and cannot store an amount of data exceeding the data capacity. As a specific reservation timing, the data capacity may be reserved prior to three-way handshaking in the TCP performed to establish a connection, or may be reserved in the middle of the three-way handshaking.

The TCP/IP has a function referred to as window control. In the window control of the TCP/IP, the data-receiving-side communication device 101 decides the window size according to the available storage capacity of the reception buffer. Further, the communication device 101 transmits, to the data-transmitting-side communication device 102, an acknowledgement (ACK) packet indicating the value of the decided window size. Further, the communication device 102 can transmit a data amount equal to or less than the window size to the communication device 101 without waiting for the next ACK package. In other words, the window size specified in the TCP represents the amount of data allowed to be transmitted from the communication device 102 by using the connection, and information about the window size that is included in the ACK packet is control information for controlling the transmission data amount of the communication device 102.

When the received packet is not read out from the reception buffer by the application, the communication device 101 notifies the communication device 102 of the ACK packet indicating a window size smaller than that when the reception buffer is empty. When the received packet is read out by the application, the available storage capacity of the reception buffer increases and the communication device 102 is notified of a larger window size in the ACK packet to be subsequently transmitted.

A window scale option is provided as an option for increasing an upper limit of the window size that can be notified in the TCP/IP. The window scale option is valid when a connection establishment request sent from the communication device 102 to the communication device 101 and a response sent by the communication device 102 in response to the connection establishment request include a parameter indicating the window scale option as illustrated in FIG. 4. When the window scale option is valid, the communication device 101 transmits the ACK packet including information about the window size according to the window scale option in the TCP, thereby notifying the communication device 102 of the window size. Specifically, a value of a Shift.cnt field in the window scale option indicates a scale factor corresponding to the amount of increase in the window size. The communication device 102 that has received the ACK packet from the communication device 101 performs bit shifting on the window field value in the TCP header by the amount corresponding to the scale factor, thereby calculating the window size.

When the window scale option is valid, the scale unit capacity corresponding to the window size is expressed as follows in a case where the window field value is 1.

$$\text{scale unit capacity} = 2^{\text{scale factor}} \text{(bytes)}$$

Accordingly, the window size is expressed as follows:

$$\text{window size} = \text{window field value} \times 2^{\text{scale factor}} \text{(bytes)}$$

In the window scale option, the scale factor is indicated by values in a range from "0" to "14". FIG. 5 is a table illustrating a correspondence relation between the scale factor and the scale unit capacity.

The window size according to the scale factor will be further described with reference to FIGS. 6A and 6B. In the present exemplary embodiment, the window size notified when the window scale option is valid is decided depending on the scale unit capacity determined by the scale factor and the available storage capacity of the reception buffer. FIG. 6A illustrates a correspondence relation between the available buffer storage capacity and the window size when the scale unit capacity is 256 bytes, i.e., when the scale factor is 8. FIG. 6B illustrates a correspondence relation between the available buffer storage capacity and the window size when the scale unit capacity is 2048 bytes, i.e., when the scale factor is 11.

In the communication using the window scale option, the window field value is an integer, and thus the window size is a multiple of the scale unit capacity, i.e., a multiple of the nth power of 2 (n is an integer corresponding to the scale factor). However, the available storage capacity of the reception buffer is not limited to a multiple of the nth power of 2. Accordingly, in the case of deciding the window size according to the available storage capacity of the reception buffer, a rounding error between the window size and the available storage capacity may occur. The window size obtained when the available storage capacity of the reception buffer is rounded down (when the window field value is set in such a manner that the window size is smaller than the available storage capacity) is a value obtained by multiplying the scale unit capacity by the quotient obtained by dividing the available storage capacity by the scale unit capacity. The window size obtained when the available storage capacity is rounded up (when the window field value is set in such a manner that the window size is greater than the available storage capacity) is a value obtained by multiplying the scale unit capacity by a value obtained by adding "1" to the quotient obtained by dividing the available storage capacity by the scale unit capacity.

If the communication device 101 constantly rounds down the available storage capacity of the reception buffer and notifies a window size smaller than the available storage capacity, only an amount of data less than the available storage capacity is transmitted from the communication device 102. Accordingly, the reception buffer cannot be efficiently used in some cases. On the other hand, when the communication device 101 constantly rounds up the available storage capacity of the reception buffer and notifies a window size larger than the available storage capacity, the communication device 102 may transmit an amount of data more than the available storage capacity of the reception buffer. Thus, the received data cannot be stored in the reception buffer and may be discarded in the communication device 101. In the present exemplary embodiment, the communication device 101 decides whether the window size is to be rounded up or rounded down depending on the state, thereby achieving a higher communication efficiency.

Figure 3:
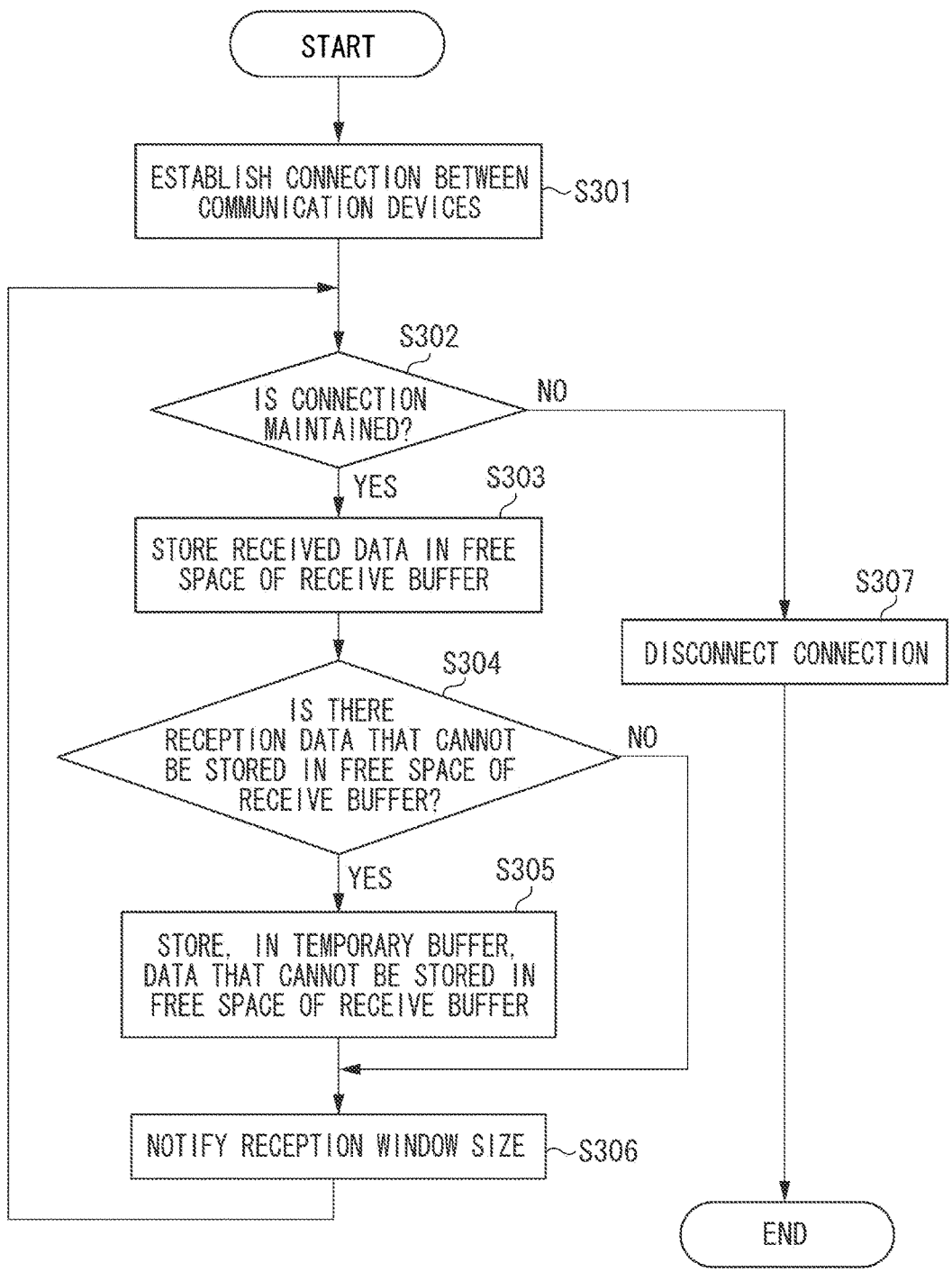
FIG. 3 is a flowchart illustrating an operation of the communication device according to one or more aspects of the present disclosure.

Referring next to FIG. 3, the operation of the communication device 101 that is performed when the communication device 101 and the communication device 102 communicate with each other will be described. The processing illustrated in FIG. 3 is started at a timing when an instruction for starting the communication between the communication device 101 and the communication device 102 is sent by the user through the input unit 204. However, the timing when the processing illustrated in FIG. 3 is started is not limited to the above-described timing. For example, the processing may be started at a timing when an instruction for starting the communication is sent by an application, or at a timing according to a timer. The processing illustrated in FIG. 3 is implemented in such a manner that the control unit 202 reads out a program stored in the storage unit 201 and executes the program.

At least a part of the processing illustrated in FIG. 3 may be implemented by hardware. In the case of implementing the processing by hardware, for example, a predetermined compiler may be used to automatically generate a dedicated circuit on a field programmable gate array (FPGA) from the program for implementing each step. The processing may also be implemented by hardware by forming a gate array circuit like in the FPGA. Further, the processing may be implemented by an application specific integrated circuit (ASIC).

In step S301, the communication device 101 establishes a connection with the communication device 102 by three-way handshaking in the TCP. In the communication performed by three-way handshaking, the communication device 101 notifies the communication device 102 of the window size in a response (SYN_ACK packet) to the connection establishment request. The window scale option is not applied to the window size notified by the SYN_ACK packet. When the window scale option is valid in the communication during the establishment of the connection, the window scale option is applied to the window size notified by the response (ACK packet) to the reception of data after the establishment of the connection.

In step S302, the communication device 101 determines whether or not to maintain the connection. If the communication device 101 determines to maintain the connection (YES in step S302), the processing proceeds to step S303. On the other hand, if the communication device 101 determines not to maintain the connection (NO in step S302), the processing proceeds to step S307, and then the communication device 101 disconnects the connection and terminates the processing. The case where the communication device 101 determines not to maintain the connection includes, for example, a case where the data transmission from the communication device 102 to the communication device 101 is not performed for a predetermined period of time, or a case where an instruction for terminating the communication is sent to the communication device 101.

In step S303, the communication device 101 stores at least a part of the data received from the communication device 102 in a free space of the reception buffer having a predetermined data capacity. In the present exemplary embodiment, at least a part of the data to be stored among the received data is an amount of data that can be stored in the free space of the reception buffer. In step S304, the communication device 101 determines whether there is received data that cannot be stored in the reception buffer due to lack of the capacity of the reception buffer, in addition to the received data stored in the reception buffer in step S303. If there is no received data that cannot be stored in the reception buffer (NO in step S304), the processing proceeds to step S306. If there is received data that cannot be stored (YES in step S304), the processing proceeds to step S305. In step S305, the communication device 101 causes a temporary buffer to store the data that cannot be stored in the reception buffer among the data received from the communication device 102. The term "temporary buffer" described herein refers to a storage area that is not allocated as the reception buffer in the storage area within the network buffer, and the storage area is temporarily used to store data that cannot be stored in the reception buffer due to lack of the capacity of the reception buffer.

Specifically, the communication device 101 stores the data received through the connection between the communication device 101 and the communication device 102 in the reception buffer, which is a reserved area, in such a manner that the received data is associated with the connection upon establishment of the connection. Further, among the data received through the connection, data that cannot be stored in the reception buffer due to lack of the capacity of the reception buffer is stored in a storage area that is not associated with a specific connection.

In step S306, the communication device 101 calculates the window size based on the available storage capacity of the reception buffer, and notifies the communication device 102 of the window size by using the ACK packet. A method for calculating the window size is described below. After the processing in step S306 is completed, the processing proceeds to step S302, and the data reception processing of steps S302 to S306 is repeated.

Figure 7:
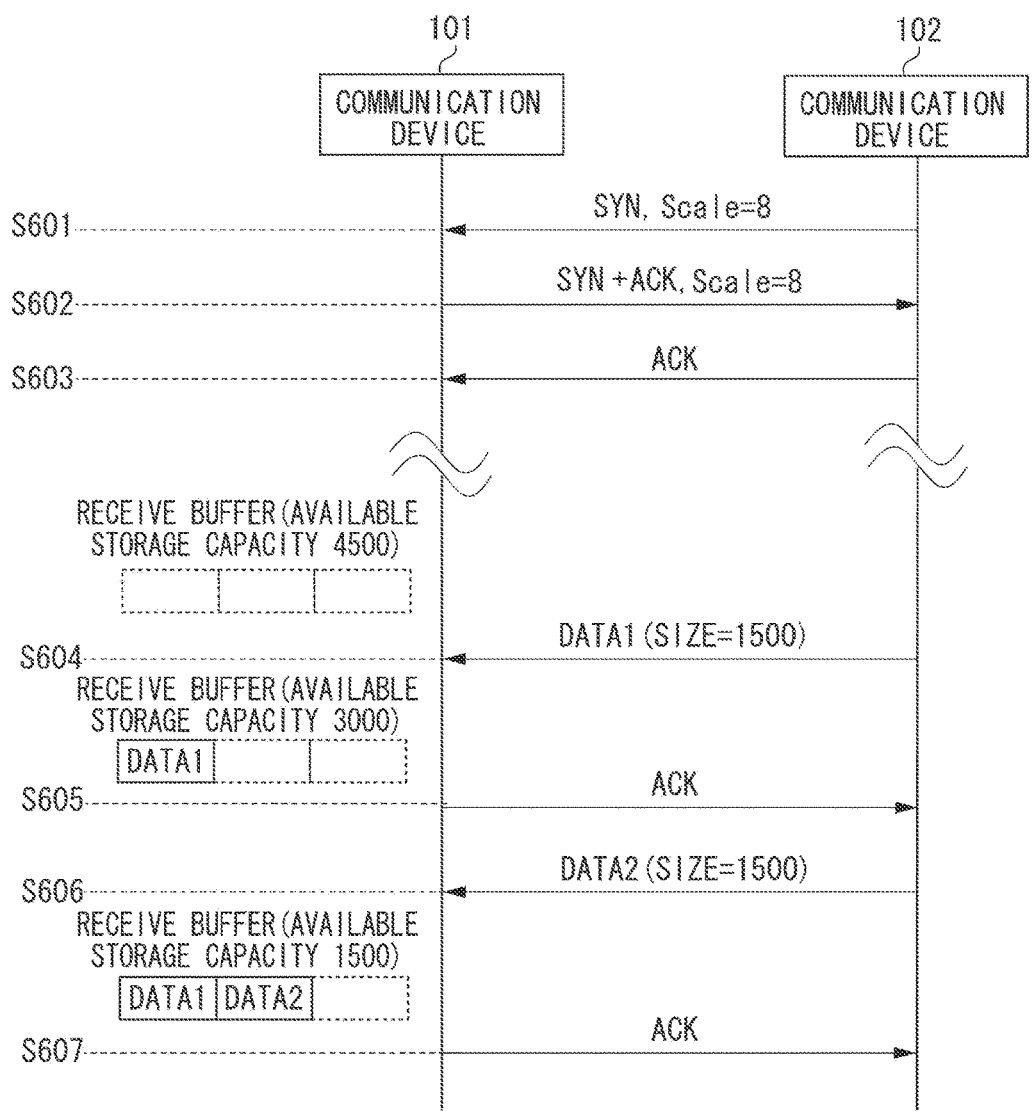
FIG. 7 is a sequence diagram illustrating a content of communication between a communication device and another communication device according to one or more aspects of the present disclosure.

FIG. 7 illustrates an example of a communication sequence performed when the communication device 101 and the communication device 102 communicate with each other. Steps S601 to S603 are a sequence related to the establishment of the connection between the communication device 101 and the communication device 102. In step S601, the communication device 102 transmits the connection establishment request to the communication device 101. In step S602, the communication device 101 transmits, to the communication device 102, a response to the connection establishment request. In this case, the value of Shift.cnt of the window scale option in each of steps S601 and S602 is "8". That is, 256 bytes are notified as the scale unit capacity.

Steps S604 to S607 are a sequence in which data is transmitted from the communication device 102 to the communication device 101 and an acknowledgment is transmitted from the communication device 101 to the communication device 102. In a case where the capacity of the reception buffer of the communication device 101 is 4500 bytes, when the communication device 101 receives data of 1500 bytes in step S604, the available storage capacity of the reception buffer is 3000 bytes. In step S605, the communication device 101 transmits the ACK packet to thereby notify the communication device 102 of the window size.

In this case, since the available storage capacity of the reception buffer is 3000 bytes and the scale unit capacity is 256 bytes, a rounding error between the window size and the available storage capacity occurs. When the available storage capacity of the reception buffer is rounded down (when "11" is set as the window field value), the window size to be notified is 2816 bytes. When the available storage capacity is rounded up (when "12" is set as the window field value), the window size to be notified is 3072 bytes. If the window size of 3072 bytes is notified when the available storage capacity of the reception buffer is 3000 bytes, the buffer may lack the capacity corresponding to 72 bytes. Accordingly, if the temporary buffer having a capacity equal to or more than 72 bytes can be allocated, the communication device 101 notifies the communication device 102 of the window size of 3072 bytes, and if the temporary buffer cannot be allocated, the communication device 101 notifies the communication device 102 of the window size of 2816 bytes.

In step S606, when the communication device 101 receives data of 1500 bytes, the available storage capacity of the reception buffer is 1500 bytes. While the communication device 101 transmits the ACK packet in step S607, a rounding error of the window size occurs, like in step S605. When the available storage capacity of the reception buffer is rounded down, the window size to be notified is 1280 bytes. When the available storage capacity of the reception buffer is rounded up, the window size to be notified is 1536 bytes. Accordingly, if the temporary buffer having a capacity equal to or more than 36 bytes, which may be an insufficient capacity of the buffer, can be secured, the communication device 101 notifies the communication device 102 of the window size of 1536 bytes. If the window size cannot be secured as the temporary buffer, the communication device 101 notifies the communication device 102 of the window size of 1280 bytes.

Specifically, the communication device 101 determines whether or not the data received from the communication device 102 can be stored in the temporary buffer. Whether or not the temporary buffer can be used is decided depending on, for example, the usage state of the network buffer for transmitting and receiving data in another connection different from the connection used to receive target data. Further, the communication device 101 decides, based on the determination result, the window size indicating the amount of data allowed to be transmitted from the communication device 102.

More specifically, the communication device 101 decides whether to make the window size to be a first data amount equal to or less than the available storage capacity of the reception buffer, or to be a second data amount larger than the available storage capacity of the reception buffer. In the present exemplary embodiment, the first data amount is a value obtained by rounding down the available storage capacity of the reception buffer according to the scale factor, and the second data amount is a value obtained by rounding up the available storage capacity of the reception buffer according to the scale factor. In other words, the first data amount is a data amount corresponding to an integral multiple of the scale unit capacity according to the scale factor, and is a maximum data amount among the data amounts that do not exceed the available storage capacity of the reception buffer. The second data amount is a data amount corresponding to an integral multiple of the scale unit capacity, and is a minimum data amount among the data amounts that are larger than the available storage capacity of the reception buffer.

The method for determining the first data amount and the second data amount is not limited to the above-described method. For example, the first data amount may be smaller than a value obtained by rounding down the available storage capacity of the reception buffer by the amount corresponding to a multiple of the scale unit capacity. The second data amount may be larger than a value obtained by rounding up the available storage capacity of the reception buffer by the amount corresponding to a multiple of the scale unit capacity.

Further, the communication device 101 determines whether or not the temporary buffer having a capacity corresponding to the data amount obtained by subtracting the available storage capacity of the reception buffer from the second data amount (rounded-up value), which is a candidate for the window size, can be used to store the data received from the communication device 102. When it is determined that the temporary buffer having a capacity corresponding to the data amount obtained after subtracting the available storage capacity cannot be used, the window size is set as the first data amount (rounded-down value). When it is determined that the temporary buffer having a capacity corresponding to the data amount obtained after subtracting the available storage capacity can be used, the window size is set as the second data amount.

After deciding the window size, the communication device 101 notifies the communication device 102 of control information according to the decided window size in the transmission of the ACK. Further, the communication device 101 receives the data transmitted from the communication device 102 in response to the notification.

In the processing as described above, when the communication device 101 can receive a larger amount of data than the available storage capacity of the reception buffer by using the temporary buffer, the communication device 102 can be controlled to transmit a larger amount of data than the available storage capacity of the reception buffer. Further, when the temporary buffer cannot be used and only an amount of data less than the available storage capacity of the reception buffer can be received, the communication device 102 can be controlled to transmit an amount of data equal to or less than the available storage capacity of the reception buffer. Thus, the communication device 101 can control the communication device 102 to transmit a larger amount of data within the range of the amount of data that can be received and stored. As a result, a larger amount of data can be received by effectively utilizing memory resources and the communication efficiency can be enhanced, while deterioration in the communication efficiency due to, for example, discarding of received data, is suppressed. Further, for example, by repeating the processing from steps S604 to S607, the communication device 101 can acquire content data from the communication device 102 and provide an image output or an audio output to the user through the output unit 205.

Although not illustrated in FIG. 7 described above, the communication device 101 according to one or more aspects of the present disclosure determines whether or not the available storage capacity of the reception buffer is equal to or more than a predetermined threshold, and decides the window size based on the determination result and the result of a determination as to whether or not the temporary buffer can be used. An operation of the communication device 101 according to one or more aspects of the present disclosure will be described with reference to FIG. 8.

Figure 8:
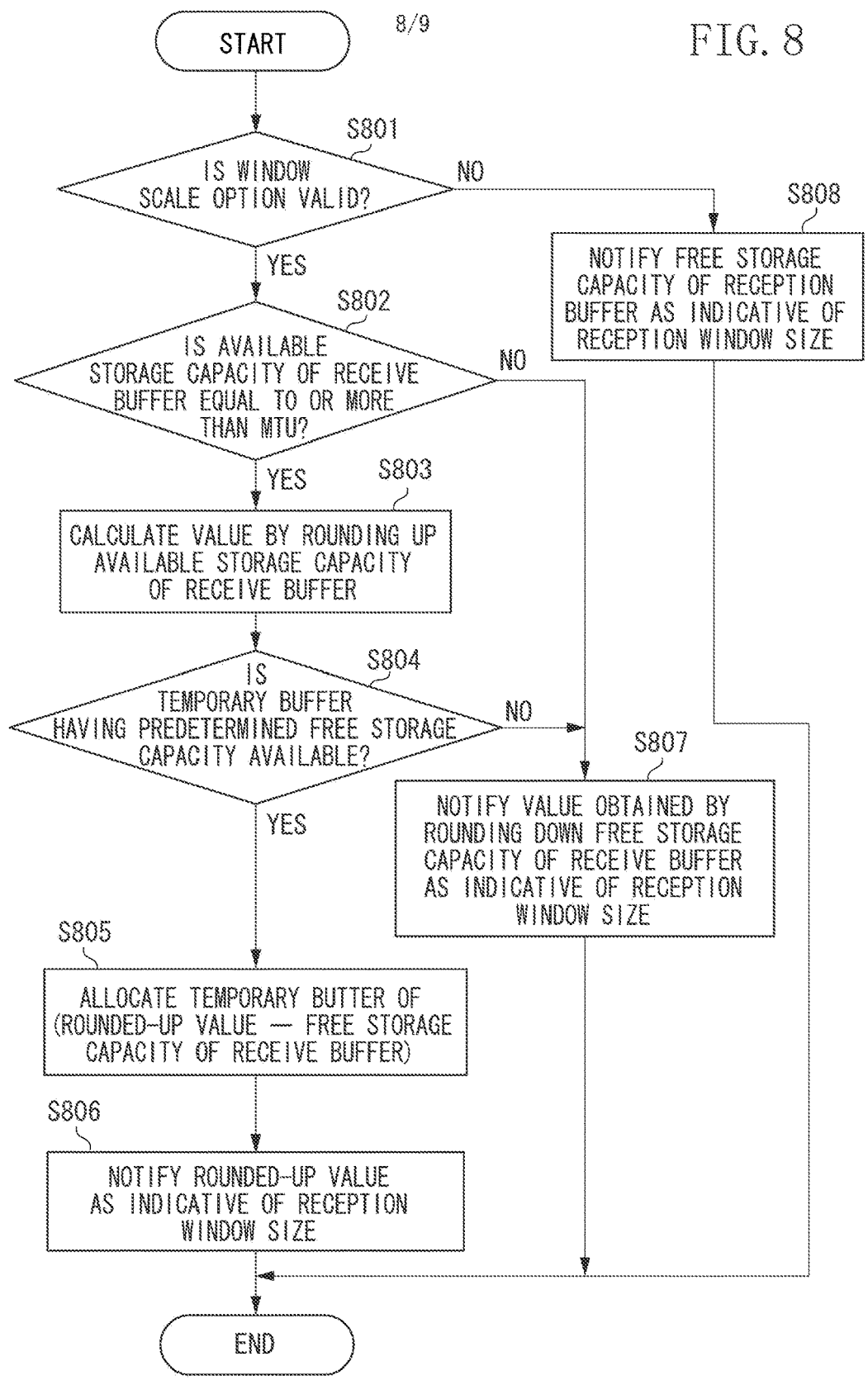
FIG. 8 is a flowchart illustrating an operation of a communication device for deciding a window size according to one or more aspects of the present disclosure.

Processing illustrated in FIG. 8 is processing performed in step S306 of FIG. 3, and the processing is started at a timing when the communication device 101 receives data and stores the data in the buffer. However, the timing when the processing illustrated in FIG. 8 is started is not limited to this timing. The processing illustrated in FIG. 8 is implemented in such a manner that the control unit 202 reads out a program stored in the storage unit 201 and executes the program.

In step S801, the communication device 101 determines whether the window scale option is valid in the connection establishment request from the communication device 102 and in the response to the connection establishment request. If it is determined that the window scale option is valid (YES in step S801), the processing proceeds to step S802. On the other hand, if it is determined that the window scale option is not valid (NO in step S801), the communication device 101 notifies the available storage capacity of the reception buffer as the window size within the range of values that can be designated as the window size. Specifically, when the available storage capacity of the reception buffer is equal to or less than an upper limit of the window size that can be notified without using the window scale option, the communication device 101 notifies the available storage capacity of the reception buffer as the window size. On the other hand, when the available storage capacity of the reception buffer is more than the upper limit of the window size, the communication device 101 notifies, for example, the value of the upper limit as the window size.

In step S802, the communication device 101 determines whether the available storage capacity of the reception buffer is equal to or more than the MTU. If it is determined that the available storage capacity of the reception buffer is equal to or more than the MTU (YES in step S802), the processing proceeds to step S803, and the window size is decided based on whether or not the temporary buffer can be used. On the other hand, if it is determined that the available storage capacity of the reception buffer is less than the MTU (NO in step S802), the processing proceeds to step S807.

In step S803, the communication device 101 calculates the rounded-up value in such a manner that the available storage capacity of the reception buffer becomes a multiple of the scale unit capacity of the window scale option. For example, when the available storage capacity of the reception buffer is 1500 bytes and the scale unit capacity is 256 bytes, the rounded-up value is 1536 bytes. In step S804, the communication device 101 subtracts the available storage capacity of the reception buffer from the value calculated in step S803, thereby calculating the amount of data that cannot be stored in the reception buffer when the amount of data calculated in step S803 is received. Further, the communication device 101 determines whether the temporary buffer having an available storage capacity that can store the data that cannot be stored in the reception buffer can be used. In step S804, if it is determined that the temporary buffer can be used (YES in step S804), the processing proceeds to S805, and if it is determined that the temporary buffer cannot be used (NO in step S804), the processing proceeds to S807.

In step S804, the communication device 101 according to one or more aspects of the present disclosure determines whether or not the temporary buffer having a capacity that is required when the value obtained by rounding up the available storage capacity of the reception buffer is set as the window size can be used. Thus, when the temporary buffer having a required capacity can be used, the temporary buffer can be effectively utilized. However, the temporary buffer is not limited to this. In step S804, the communication device 101 may determine whether or not the temporary buffer having a predetermined capacity, such as the scale unit capacity, can be used.

In step S805, the communication device 101 allocates to a temporary buffer, the storage area within the network buffer having the available storage capacity that can store the amount of data calculated in step S804. The temporary buffer is used to store the data that cannot be stored in the reception buffer due to lack of the available storage capacity of the reception buffer among the data received by the communication device 101 from the communication device 102. When there is a storage area allocated as the temporary buffer after the processing illustrated in FIG. 8 has been previously performed, the capacity of the allocated storage area is compared with the amount of data calculated in step S804. When the capacity of the allocated storage area is smaller than the amount of data calculated in step S804, a storage area having a capacity corresponding to the difference between the capacity of the allocated storage area and the calculated amount of data is newly allocated as the temporary buffer. On the other hand, when the capacity of the allocated storage area is larger than the amount of data calculated in step S804, the allocation of the storage area having the capacity corresponding to the difference is released.

In step S806, the communication device 101 notifies the communication device 102 of the value calculated in step S803 as the window size. Meanwhile, in step S807, the communication device 101 notifies, as the window size, a value obtained by rounding down the available storage capacity of the reception buffer in such a manner that the value becomes a multiple of the scale unit capacity of the window scale option. For example, when the available storage capacity of the reception buffer is 1500 bytes and the scale unit capacity is 256 bytes, the rounded-down value is 1280 bytes.

By performing the processing illustrated in FIG. 8, when the reception buffer has an available storage capacity equal to or greater than the MTU, the communication device 101 can effectively utilize the available storage capacity by using the temporary buffer as much as possible. Further, for example, when the capacity of the storage area available as the temporary buffer is small, the communication device 101 cannot allocate the temporary buffer having a sufficient capacity to a plurality of reception buffers respectively corresponding to a plurality of connections. Accordingly, when the available storage capacity of the reception buffer is smaller than the MTU, the communication device 101 suppresses the use of the temporary buffer, thereby enabling the network buffer, which is a storage area with a limited capacity, to be more easily used for other processing.

In step S802, the communication device 101 may also determine whether or not the scale unit capacity is less than the MTU, as well as in addition to determining whether or not the available storage capacity of the reception buffer is equal to or more than the MTU. Further, when the available storage capacity of the reception buffer is equal to or more than the MTU and the scale unit capacity is less than the MTU, the communication device 101 sets the value obtained by rounding down the available storage capacity of the reception buffer as the window size. Also when the available storage capacity of the reception buffer is less than the MTU, the value obtained by rounding down the available storage capacity of the reception buffer is set as the window size. On the other hand, when the available storage capacity of the reception buffer is equal to or more than the MTU and the scale unit capacity is equal to or more than the MTU, the window size is decided based on whether or not the temporary buffer can be used.

According to the processing described above, in a case where a large rounding error of the scale unit capacity which is equal to or more than the MTU is likely to occur, the communication device 101 uses the temporary buffer as much as possible to prevent an increase in the size of a part of the available storage capacity of the reception buffer that is not utilized. In a case where a rounding error of the scale unit capacity which is less than the MTU is likely to occur, the communication device 101 suppresses the use of the temporary buffer, thereby enabling the network buffer to be more easily used for other processing.

In the processing illustrated in FIG. 8, it is determined whether or not the temporary buffer can be used when the available storage capacity of the reception buffer is equal to or more than the MTU as the predetermined threshold. However, the predetermined threshold is not limited to this. The predetermined threshold may be, for example, another value such as the scale unit capacity. Further, the communication device may decide the window size based only on whether or not the temporary buffer can be used, without comparing the available storage capacity of the reception buffer with the predetermined threshold. Furthermore, the determination as to whether or not the temporary buffer can be used may be made when the available storage capacity of the reception buffer is less than the predetermined threshold. For example, the communication device 101 determines whether or not the available storage capacity of the reception buffer is less than the scale unit capacity, instead of performing the processing in step S802. When the available storage capacity of the reception buffer is less than the scale unit capacity, the processing proceeds to step S803 and the window size is decided based on whether or not the temporary buffer can be used. On the other hand, when the available storage capacity of the reception buffer is equal to or more than the scale unit capacity, the processing proceeds to step S807 and the value obtained by rounding down the available storage capacity is set as the window size.

According to the processing as described above, when the window size is 0 and no more data can be received without using the temporary buffer, the communication device 101 can continuously receive data by using the temporary buffer as much as possible. Further, when data can be received without using the temporary buffer, the communication device 101 suppresses the use of the temporary buffer, thereby enabling the network buffer to be more easily used for other processing.

The communication device 101 may decide the window size based on at least one of the difference between the available storage capacity of the reception buffer and the first data amount equal to or less than the available storage capacity and the difference between the available storage capacity of the reception buffer and the second data amount more than the available storage capacity. The first data amount is, for example, a value obtained by rounding down the available storage capacity of the reception buffer, and the second data amount is, for example, a value obtained by rounding up the available storage capacity of the reception buffer. Specifically, the communication device 101 determines whether or not the difference between the available storage capacity of the reception buffer and the first data amount is equal to or greater than a predetermined value, instead of performing the processing in step S802 of FIG. 8. Further, when the difference between the available storage capacity of the reception buffer and the first data amount is equal to or greater than the predetermined value, the processing proceeds to step S803 to decide the first data amount or the second data amount as the window size to be set based on whether or not the temporary buffer can be used. On the other hand, when the difference between the available storage capacity of the reception buffer and the first data amount is less than the predetermined value, the processing proceeds to step S807 and the first data amount is set as the window size.

Figure 9:
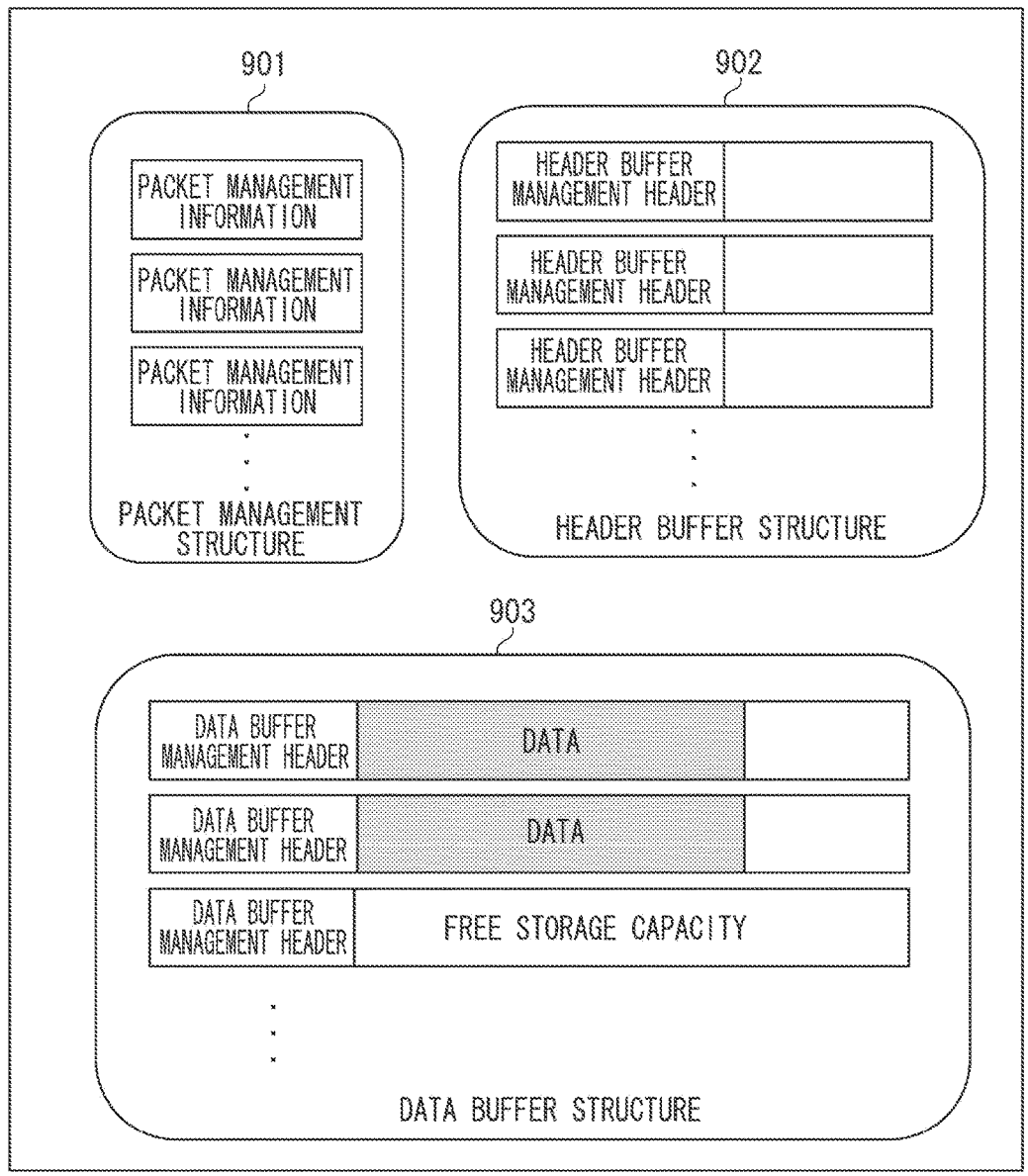
FIG. 9 is a diagram illustrating an internal structure of a network buffer according to one or more aspects of the present disclosure.

According to the processing described above, when the first data amount is notified as the window size and a part of the available storage capacity of the reception buffer that cannot be utilized is large, the communication device 101 can effectively utilize the reception buffer by notifying the second data amount. On the other hand, even when the first data amount is notified, if a part of the reception buffer that cannot be utilized is small, the first data amount is notified to suppress the use of the temporary buffer, thereby enabling the network buffer having a limited capacity to be more easily used for other processing. Advantageous effects similar to those described above can also be obtained by determining whether or not the difference between the available storage capacity of the reception buffer and the second data amount is less than the predetermined value, instead of performing the processing in step S802. In the processing in step S804 of FIG. 8, it is determined whether or not a storage area available as the temporary buffer having a predetermined capacity is present in the network buffer. However, the determination target may be limited not to the entire network buffer, but to a specific storage area within the network buffer. To illustrate the operation of the communication device 101 that is performed in this case, the internal structure of the network buffer to be developed in the storage unit 201 of the communication device 101 will be described with reference to FIG. 9. The network buffer includes a packet management structure 901 for managing packets to be transmitted and received, a header buffer structure 902 for storing a header part of each packet, and a data buffer structure 903 for storing a data part of each packet. The data buffer structure 903 is a divided area obtained by dividing an area within the network buffer for storing a data part of each packet in a predetermined division unit. Similarly, the header buffer structure 902 is a divided area obtained by dividing an area for storing a header part of each packet. The packet management structure 901 is a structure for processing, as packets, the header part stored in the header buffer structure 902 and the data part stored in the data buffer structure 903 in such a manner that the header part and the data part are associated with each other.

While the present exemplary embodiment illustrates a case where the network buffer has three types of structures, the present disclosure is not limited to this case. For example, the network buffer may not include the packet management structure 901, and the header part and the data part may be associated with each other in another structure different from the packet management structure 901. Further, the network buffer may not include the header buffer structure 902, and the header part of each packet may be stored in the data buffer structure 903.

The capacity of the reception buffer and the total capacity of the data buffer structure 903 allocated to the reception buffer need not necessarily match each other. For example, when the capacity of the reception buffer is twice larger than the predetermined capacity of the data buffer structure 903 and smaller than triple the predetermined capacity, three data buffer structures 903 are allocated to the reception buffer. In this case, in at least one of the three data buffer structures 903, a part of the data capacity corresponds to the reception buffer, and the other part thereof is not used as the reception buffer. Further, a part of the data buffer structure 903 that is allocated to a certain reception buffer is not used as another reception buffer.

Accordingly, in step S804 of FIG. 8, the communication device 101 may determine whether or not a part that does not correspond to the reception buffer in the data buffer structure 903 in which a part of the data capacity corresponds to the reception buffer can be used as the temporary buffer. Specifically, the storage area about which it is determined whether or not the temporary buffer in the network buffer can be used may be limited to the data buffer structure 903 which is partially used for the reception buffer. Further, when the data buffer structure 903 including a part available as the temporary buffer having a predetermined capacity is present, the processing proceeds to step S805, and when the data buffer structure 903 is not present, the processing proceeds to step S807. Specifically, when the sum total of the available storage capacity of the data buffer structure 903 allocated to the reception buffer is equal to or greater than the value obtained by rounding up the available storage capacity of the reception buffer, it is determined that the temporary buffer can be used.

According to the processing as described above, the communication device 101 maximizes use of the storage area that is not used for other processing in the storage area within the network buffer, as the temporary buffer as much as possible. As a result, the communication device 101 can receive a larger amount of data by effectively utilizing memory resources without interrupting the use of the network buffer for other processing.

In the above description with reference to FIG. 8, the communication device 101 determines whether or not the temporary buffer can be used, every time the window size is notified. However, the determination method is not limited to this. For example, the communication device 101 may determine whether or not the temporary buffer having a capacity corresponding to the scale unit capacity can be used to store the data received from the communication device 102 through the connection upon establishment of the connection in step S301 of FIG. 3. When it is determined that the temporary buffer can be used, the communication device 101 secures the storage area to be used as the temporary buffer, from the storage area within the network buffer that is not associated with a specific connection. Further, the communication device 101 sets, as the window size to be notified in the target connection, the value obtained by rounding up the available storage capacity of the reception buffer. On the other hand, when it is determined that the temporary buffer cannot be used, the communication device 101 sets, as the window size to be notified in the target connection, the value obtained by rounding down the available storage capacity of the reception buffer.

According to the processing as described above, the communication device 101 may determine only once whether or not the temporary buffer can be used and the temporary buffer may be secured upon establishment of a connection, which leads to a reduction in processing load.

As described above, the communication device 101 according to one or more aspects of the present disclosure determines whether another storage area can be used to store the data received from the communication device 102, in addition to the reception buffer having a predetermined data capacity. Further, the communication device 101 decides the amount of data allowed to be transmitted from the communication device 102 based on the determination result, and sends a notification corresponding to the decided amount of data allowed to be transmitted, to the communication device 102. Then, the communication device 101 receives the data transmitted from the communication device 102 in response to the notification, stores the received data in the reception buffer, and can store, in another storage area, the received data that cannot be stored in the reception buffer due to lack of the capacity among the received data.

With this configuration, the communication device 101 can communicate with the communication device 102 using the amount of communication data corresponding to the amount of data that can be stored. For example, if another storage area different from the reception buffer can be used, the communication device 101 allows the communication device 102 to transmit a larger amount of data than the available storage capacity of the reception buffer, and if another storage area cannot be used, the communication device 101 allows the communication device 102 to transmit an amount of data equal to or smaller than the available storage capacity of the reception buffer. As a result, the throughput of communication can be enhanced while preventing the received packets from being discarded without being stored in the buffer.

While in the present exemplary embodiment, the case where the communication device 101 and the communication device 102 perform communication using the window scale option has been mainly described, the present disclosure can also be applied to a case where communication is performed without using the window scale option. Specifically, when the temporary buffer can be used, the communication device 101 may notify, as the window size, a value that is greater than the available storage capacity of the reception buffer, and when the temporary buffer cannot be used, the communication device 101 may notify, as the window size, a value that is equal to or smaller than the available storage capacity, regardless of the scale factor.

While in the present exemplary embodiment, the case where the communication device 101 and the communication device 102 perform communication in accordance with the TCP/IP has been mainly described, the protocols to be used are not limited to these protocols. For example, the communication device 101 and the communication device 102 may perform communication in accordance with a user datagram protocol (UDP). Further, functions such as controlling the communication data amount, which is described in the present exemplary embodiment, may be implemented by a message created in a protocol of a layer higher than the TCP, such as HTTP.

According to one or more aspects of the present disclosure described above, a communication device can communicate with another communication device using an amount of communication data according to the amount of data that can be stored.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims is to be accorded the broadest interpretation so as to encompass all such modifications and equivalent structures and functions.

This application claims the benefit of Japanese Patent Application No. 2016-201254, filed Oct. 12, 2016, which is hereby incorporated by reference herein in its entirety.

What is claimed is:

1. A communication device comprising:
  a reception unit configured to receive data transmitted from another communication device in response to a notification indicating an amount of data allowed to be transmitted;
  a storage unit configured to store the data received by the reception unit in a storage area;
  a determination unit configured to determine whether or not another buffer can be secured as a storage area in which data is stored by the storage unit, in addition to a reception buffer having a capacity reserved upon establishment of a logical communication path between the communication device and the another communication device, the another buffer being configured to store data that cannot be stored in the reception buffer among the data received by the reception unit;
  a decision unit configured to decide the amount of data allowed to be transmitted from the another communication device based on a result of the determination by the determination unit; and
  a notification unit configured to send, to the another communication device, a notification indicating the amount of data allowed to be transmitted which is decided by the decision unit.

2. The communication device according to claim 1, wherein the reception buffer is a storage area reserved in such a manner that the storage area is associated with the communication path upon establishment of the communication path, and
wherein the determination unit determines whether or not the another buffer can be secured from a storage area that is not associated with a specific communication path.

3. The communication device according to claim 1, wherein the decision unit decides one of a first data amount and a second data amount to be set as the amount of allowed data, the first data amount being equal to or less than an available storage capacity of the reception buffer, the second data amount being larger than the available storage capacity of the reception buffer.

4. The communication device according to claim 3, wherein the determination unit determines whether or not the another buffer having a capacity corresponding to a data amount can be secured, the data amount being obtained by subtracting the available storage capacity of the reception buffer from the second data amount, the second data amount being a candidate for the amount of allowed data.

5. The communication device according to claim 4, wherein the decision unit decides the first data amount as the amount of allowed data when the determination unit determines that the another buffer having a capacity corresponding to the subtracted data amount cannot be secured, and the decision unit decides the second data amount as the amount of allowed data when the determination unit determines that the another buffer having a capacity corresponding to the subtracted data amount can be secured.

6. The communication device according to claim 3, wherein when the available storage capacity of the reception buffer is larger than a threshold, the decision unit decides the amount of allowed data based on a result of the determination by the determination unit, and when the available storage capacity of the reception buffer is smaller than the threshold, the decision unit decides the amount of allowed data as the first data amount.

7. The communication device according to claim 6, wherein the threshold is a maximum transmission unit (MTU) in the communication path between the communication device and the another communication device.

8. The communication device according to claim 7, wherein when the available storage capacity of the reception buffer is larger than the MTU and a scale unit capacity determined by a scale factor of a window scale option in a transmission control protocol (TCP) is smaller than the MTU, the decision unit decides the amount of allowed data as the first data amount.

9. The communication device according to claim 3, wherein when the available storage capacity of the reception buffer is smaller than a threshold, the decision unit decides the amount of allowed data based on a result of the determination by the determination unit, and when the available storage capacity of the reception buffer is larger than the threshold, the decision unit decides the amount of allowed data as the first data amount.

10. The communication device according to claim 9, wherein the threshold is a scale unit capacity determined by a scale factor of a window scale option in a TCP.

11. The communication device according to claim 3, wherein the decision unit decides one of the first data amount and the second data amount as the amount of allowed data based on at least one of a difference between the available storage capacity of the reception buffer and the first data amount, and a difference between the available storage capacity of the reception buffer and the second data amount.

12. The communication device according to claim 3, wherein the notification unit transmits a window size according to a scale factor of a window scale option in a TCP as a notification indicating the amount of allowed data, and
wherein the decision unit decides, as the amount of allowed data, one of the first data amount and the second data amount, the first data amount being a data amount corresponding to an integral multiple of a scale unit capacity determined by the scale factor and being equal to or less than the available storage capacity of the reception buffer, the second data amount being a data amount corresponding to an integral multiple of the scale unit capacity and being larger than the available storage capacity of the reception buffer.

13. The communication device according to claim 1, wherein the determination unit determines whether or not the another buffer can be secured from a part of a divided area that does not correspond to the reception buffer among a plurality of divided areas obtained by dividing an area in which data is stored by the communication device in a predetermined division unit, the divided area being an area in which a part of a data capacity corresponds to the reception buffer.

14. The communication device according to claim 1, wherein the determination unit determines whether or not the buffer having a capacity corresponding to a scale unit capacity can be secured upon establishment of the communication path, the scale unit capacity being determined by a scale factor of a window scale option in a TCP.

15. The communication device according to claim 1, wherein the reception buffer is a buffer corresponding to a TCP connection as the logical communication path between the communication device and the another communication device, and
wherein the notification unit transmits a window size specified in a TCP as a notification indicating the amount of allowed data.

16. A communication method that is executed by a communication device, the communication method comprising:
determining whether or not another buffer for storing data that cannot be stored in a reception buffer among data transmitted from another communication device can be secured, in addition to the reception buffer having a capacity reserved when a logical communication path is established between the communication device and the another communication device;
deciding an amount of data allowed to be transmitted from the another communication device based on a determination result in the determination;
sending, to the another communication device, a notification indicating the decided amount of data allowed to be transmitted;
receiving the data transmitted from the another communication device in response to the notification;
a first storing of storing the received data in the reception buffer; and
a second storing of storing, in the another buffer, data that is not stored in the reception buffer among the received data.

17. The communication method according to claim 16, wherein the reception buffer is a storage area reserved in such a manner that the storage area is associated with the communication path when the communication path is established, and wherein the determination includes determining whether or not the another buffer can be secured from a storage area that is not associated with a specific communication path.

18. The communication method according to claim 16, wherein the decision includes deciding, as the amount of allowed data, one of a first data amount and a second data amount, the first data amount being equal to or less than the available storage capacity of the reception buffer, the second data amount being larger than the available storage capacity of the reception buffer.

19. A non-transitory computer-readable storage medium storing a program for causing a computer to execute a communication method, the communication method comprising:

determining whether or not another buffer for storing data that cannot be stored in a reception buffer among data transmitted from another communication device can be secured, in addition to the reception buffer having a capacity reserved when a logical communication path is established between the communication device and the another communication device;

deciding an amount of data allowed to be transmitted from the another communication device based on a determination result in the determination;

sending, to the another communication device, a notification indicating the decided amount of data allowed to be transmitted;

receiving the data transmitted from the another communication device in response to the notification;

a first storing of storing the received data in the reception buffer; and a second storing of storing, in the another buffer, data that is not stored in the reception buffer among the received data.

* * * * *